(12) United States Patent
Satish et al.

(10) Patent No.: US 8,239,953 B1
(45) Date of Patent: Aug. 7, 2012

(54) APPLYING DIFFERING SECURITY POLICIES FOR USERS WHO CONTRIBUTE DIFFERENTLY TO MACHINE HYGIENE

(75) Inventors: Sourabh Satish, Fremont, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 794 days.

(21) Appl. No.: 12/412,232

(22) Filed: Mar. 26, 2009

(51) Int. Cl.
*G06F 11/00* (2006.01)

(52) U.S. Cl. .............................. 726/25; 726/1; 726/27

(58) Field of Classification Search ................ 726/1, 25, 726/27
See application file for complete search history.

(56) References Cited

U.S. PATENT DOCUMENTS

| | | | |
|---|---|---|---|
| 7,284,124 B1 | 10/2007 | Ginsberg | |
| 7,490,356 B2 | 2/2009 | Lieblich et al. | |
| 7,617,519 B2 | 11/2009 | Williams | |
| 7,647,634 B2 | 1/2010 | Mayfield et al. | |
| 7,707,632 B2 | 4/2010 | Nath et al. | |
| 7,761,912 B2 | 7/2010 | Yee et al. | |
| 7,788,700 B1 | 8/2010 | Feezel et al. | |
| 7,831,522 B1 | 11/2010 | Satish et al. | |
| 7,870,609 B2 | 1/2011 | Hulten et al. | |
| 7,917,481 B1 | 3/2011 | Kale et al. | |
| 2002/0046041 A1* | 4/2002 | Lang ................................. 705/1 | |
| 2004/0019807 A1 | 1/2004 | Freund | |
| 2006/0253458 A1 | 11/2006 | Dixon et al. | |
| 2006/0253583 A1 | 11/2006 | Dixon et al. | |
| 2007/0033636 A1 | 2/2007 | Buckley et al. | |
| 2007/0064617 A1 | 3/2007 | Reves | |
| 2007/0067844 A1 | 3/2007 | Williamson et al. | |
| 2007/0094260 A1 | 4/2007 | Murphy et al. | |
| 2007/0168311 A1 | 7/2007 | Genty et al. | |
| 2007/0261116 A1 | 11/2007 | Prafullchandra et al. | |
| 2008/0022384 A1 | 1/2008 | Yee et al. | |
| 2008/0052758 A1 | 2/2008 | Byrnes | |
| 2008/0092235 A1 | 4/2008 | Comlekoglu | |
| 2008/0115213 A1 | 5/2008 | Bhatt et al. | |
| 2008/0120699 A1* | 5/2008 | Spear ................................. 726/4 |
| 2008/0133531 A1 | 6/2008 | Baskerville et al. | |
| 2008/0141366 A1 | 6/2008 | Cross et al. | |
| 2008/0189788 A1 | 8/2008 | Bahl | |

(Continued)

OTHER PUBLICATIONS

Egan, G., "Not All Reputation Technologies are Created Equal," Symantec Corporation, Sep. 22, 2009, [Online] [Retrieved on Mar. 30, 2010] Retrieved from the Internet<URL:http://www.symantec.com/connect/blogs/not-all-reputation-technologies-are-created-equal>.

(Continued)

*Primary Examiner* — Haresh N Patel
*Assistant Examiner* — Harunur Rashid
(74) *Attorney, Agent, or Firm* — Fenwick & West LLP

(57) ABSTRACT

A security module manages differences in hygiene by applying differing levels of security policy to interactions of users with clients according to separate hygiene of the users and the clients. The module monitors computer security practices of clients and users in an environment, and uses this to client a machine hygiene score for a given client and a user hygiene score for a given user. The scores represent an assessment of the trustworthiness of the client and of the user. The module dynamically combines the scores computed for an interaction between the given user and given client, and applies a level of security policy to the interaction accordingly, determining what activities can be performed on the client based on the level of policy applied.

14 Claims, 5 Drawing Sheets

U.S. PATENT DOCUMENTS

| | | | |
|---|---|---|---|
| 2008/0255928 | A1 | 10/2008 | Tomeny |
| 2008/0288330 | A1* | 11/2008 | Hildebrand et al. ............ 705/10 |
| 2009/0044024 | A1 | 2/2009 | Oberheide et al. |
| 2009/0165131 | A1 | 6/2009 | Treadwell |
| 2009/0172815 | A1 | 7/2009 | Gu et al. |
| 2009/0240769 | A1 | 9/2009 | Schran |
| 2009/0282476 | A1 | 11/2009 | Nachenberg et al. |
| 2009/0287819 | A1 | 11/2009 | Iverson |
| 2009/0328209 | A1 | 12/2009 | Nachenberg |
| 2009/0328224 | A1 | 12/2009 | Hernacki et al. |
| 2010/0031361 | A1 | 2/2010 | Shukla |
| 2010/0125911 | A1* | 5/2010 | Bhaskaran ...................... 726/23 |

OTHER PUBLICATIONS

Ioffe, J., "To Catch a Cyberthief: How Symantec Does It," Fortune Brainstorm Tech, Sep. 14, 2009, 3 pages [Online] [Retrieved on Mar. 30, 2010] Retrieved from the Internet<URL:http://brainstormtech.blogs.fortune.cnn.com/2009/09/14/to-catch-a-cyberthief-how-symantec-does-it/ >.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

European Extended Search Report, European Application No. 09169538.7, Oct. 25, 2010, 5 pages.

"GreenBorder", Wikipedia, 1 page, [online] [Retrieved on Dec. 31, 2008] Retrieved from the Internet <URL:http://en.wikipedia.org/w/index.php?title=GreenBorder&printable=yes>.

Rubenking, N., "Nonsignature Antimalware", PCMag.com, Oct. 30, 2006, 6 pages, [online] [Retrieved on Dec. 31, 2008] Retrieved from the Internet <URL:http://www.pcmag.com/print_article2/0,1217,a%253D181852,00.asp>.

European Examination Report, European Application No. 09169538.7, Jan. 16, 2012, 4 pages.

* cited by examiner

APPLYING DIFFERING SECURITY POLICIES FOR USERS WHO CONTRIBUTE DIFFERENTLY TO MACHINE HYGIENE

BACKGROUND OF THE INVENTION

1. Field of the Invention

This invention pertains in general to computer security, and more specifically to managing computer hygiene by applying differing security policies to different users using the same computer.

2. Description of the Related Art

Computer systems are continually threatened by a risk of attack from malicious computer code, also known as "malware." Malware threats include computer viruses, worms, Trojan horse programs, spyware, adware, crimeware, and phishing web sites. Malicious code can spread through a variety of different routes. For example, malicious code can spread via an email message or when a user inserts a disk or other infected medium. Malware can also access and cause damage to a user's computer when a user installs new programs that are infected, visits untrustworthy websites, downloads suspicious files, or otherwise takes actions that expose a computer to malware risks.

In a corporate environment, managing workstation security problems can be a great challenge. Multiple users often share a single computer, subjecting that computer to different levels of malware risk. While certain users may apply sound security practices, others may regularly engage in behaviors that open the computer up to infection by malicious code and detract from the overall hygiene of that machine. For example, downloading or installing untrustworthy files, visiting suspicious websites, opening risky email attachments, applying poor password protection practices, etc. can all lead to malware infections. To manage different levels of risk in these multi-user scenarios, companies are often forced to limit all actions that can be taken using a given workstation. Users may be prohibited, when using that computer, from visiting certain websites, installing certain programs of unknown reputation, or performing other actions that are considered risky. Even users who carefully adhere to security guidelines can be affected because security policies are commonly applied equally across all users. This can lead to frustration amongst the users and limit productivity in the company since the actions that these good-hygiene users can take on the workstation are limited due to the poor computer-use hygiene of other users.

Within an enterprise, security policies are also typically applied across all computers regardless of the level of security or hygiene of a particular computer. Even on a machine for which security patches are regularly downloaded and kept current, for which user account controls are enabled, for which passwords are required to be regularly changed, etc., the freedom is limited. The computer is commonly treated equally to all other machines, just as good-hygiene users and poor-hygiene users are treated equally. The activities that users can perform on that machine are restricted to the same degree as on other less-secure machines.

In the current multi-user operating system environments with enterprise-roaming users, it can be a problem to apply the same level of security policies or restrictions to a given computer irrespective of the user. Similarly, the hygiene of a given computer should also be taken into account so that all computers do not have to be equally restricted based on security policies. Therefore, there is a need in the art for a solution that separates the user's actions and responsibility for the overall hygiene of a computer from the administrator's responsibilities and actions.

DISCLOSURE OF INVENTION

The above and other needs are met by a method, computer-implemented system, and computer program product in which a security module applies differing levels of security policy to interactions of users with computers according to the separate hygiene of the users and the computers. An embodiment of the method comprises computing a machine hygiene score for the client based on computer security practices of the client. The machine hygiene score represents an assessment of the trustworthiness of the client. The method further comprises computing a user hygiene score for a user of the client based on the computer security practices of the user. The user hygiene score represents an assessment of the trustworthiness of the user. The method also includes dynamically combining the user hygiene score computed and the machine hygiene score computed to determine a combined score for an interaction in which the user uses the client. In addition, the method includes applying a level of security policy to the interaction between the user and the client responsive to the combined score. The security policy applied determines what activities the user can perform on the client. In some embodiments, the method includes monitoring computer security practices of the client and of the user, wherein results of the monitoring are used in computing the machine hygiene score and the user hygiene score, respectively.

In an embodiment of the system, a scoring module computes a machine hygiene score for the client based on computer security practices of the client, where the machine hygiene score represents an assessment of the trustworthiness of the computer. The scoring module further computes a user hygiene score for a user of the client based on the computer security practices of the user, where the user hygiene score represents an assessment of the trustworthiness of the user. A score combination module dynamically combines the user hygiene score computed and the machine hygiene score computed to determine a combined score for an interaction in which the user uses the client. A security application module applies a level of security policy to the interaction between the user and the client responsive to the combined score. The security policy applied determines what activities the user can perform on the client. In one embodiment, the system further includes a monitoring module for monitoring computer security practices of the client, where the results of the monitoring are used in computing the machine hygiene score. The monitoring module can also monitor the computer security practices of the user, where results of the monitoring are used in computing the user hygiene score.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
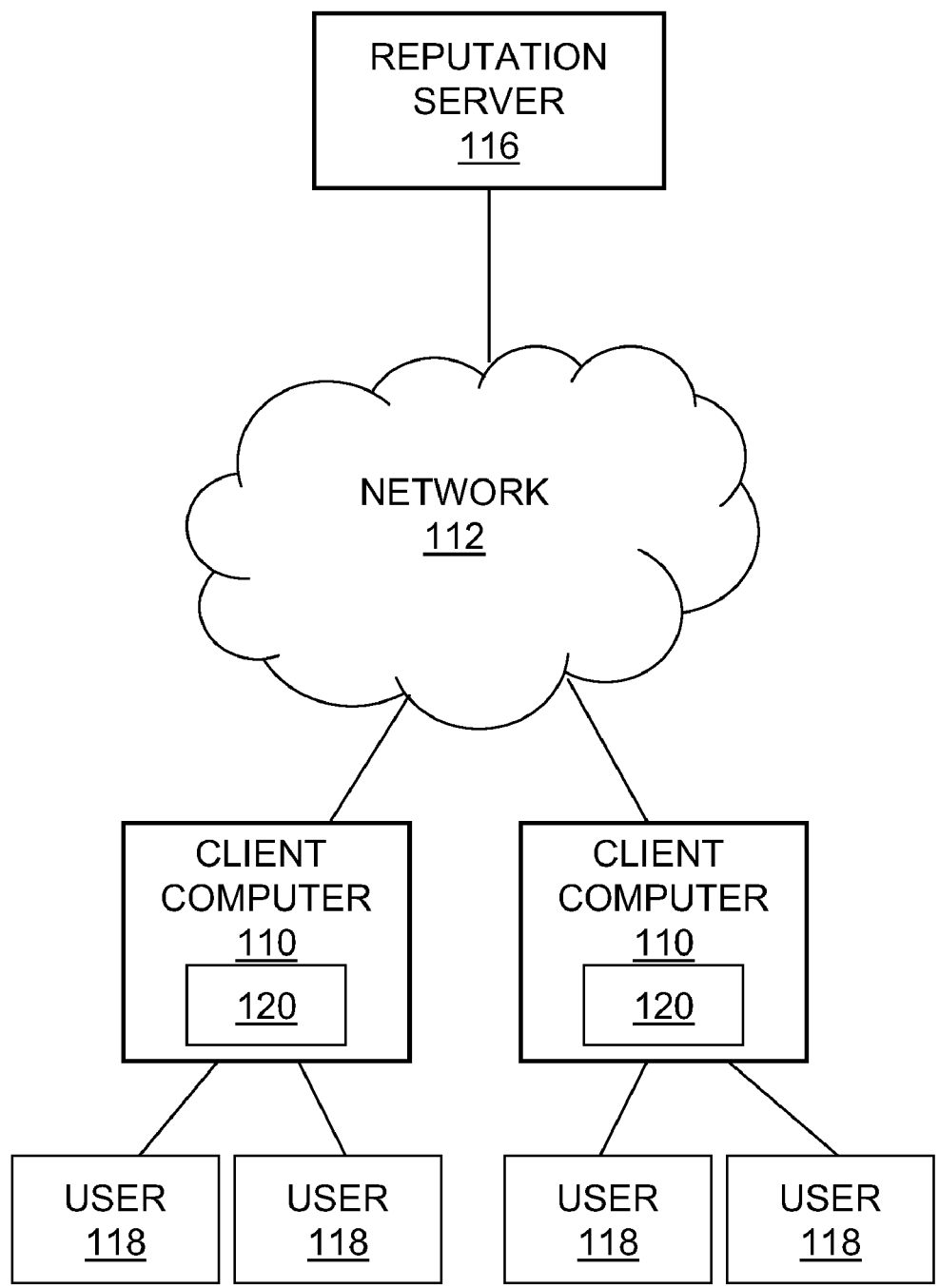
FIG. 1 is a high-level block diagram illustrating an example of a standard computing environment 100, according to one embodiment of the present invention.

FIG. 1 is a high-level block diagram illustrating a computing environment 100 according to an embodiment. FIG. 1 illustrates a reputation server 116 and client computers 110 connected by a network 112 (e.g., a local area network, a wide area network, the Internet, or another type of network.). FIG. 1 also illustrates multiple users 118 accessing or otherwise using the client computers 110. Only two client computers 110 and only a few users 118 are shown in FIG. 1 in order to simplify and clarify the description. Embodiments of the computing environment 100 can have thousands or millions of client computers 110, as well as multiple servers 116. Similarly, each client computer 110 can have a large number of different users. In some embodiments, the clients 110 are only connected to the network 112 for a certain period of time or not at all.

The clients 110 are computers or other electronic devices used by one or more users 118 that can interact with the server 116 or other clients 110. The clients 110, for example, can be personal computers allowing users to perform activities including downloading, installing, and/or executing files and browsing web sites on the network 112. In other embodiments, the clients 110 are network-capable devices other than a computer, such as a personal digital assistant (PDA), a mobile telephone, a pager, a television "set-top box," etc. The client computers 110 preferably execute an operating system (e.g., LINUX®, one of the versions of MICROSOFT WINDOWS®, and PALM OS®), which controls the operation of the computer system, and execute one or more application programs. For purposes of this description, the term "client computer" also includes computers such as servers and gateways that encounter files or other entities that might constitute malware or other threats. For example, a client 110 can be a network gateway located between an enterprise network and the Internet. The client 110 can also be a mail server or web server that stores files that can be accessed by other clients.

The security of the client computers 110 is maintained using a hygiene system in which separate hygiene scores are calculated for users 118 and for computers 110. Hygiene scores for a given client computer 110 are referred to as "machine hygiene scores." Hygiene scores for users 118 of the client computers 110 are referred to as "user hygiene scores." A client computer's machine hygiene score represents an assessment of the trustworthiness of the client 110, while a user's hygiene score represents an assessment of the trustworthiness of the user 118. "Trustworthiness" of the client 110 in this context refers to the client's propensity for becoming infected by malware and other computer related threats, where a client 110 that is infected more often or conducts risky behavior likely to lead to infection is less trustworthy. The trustworthiness or hygiene of the client 110 includes factors that the user 118 may not have control over. For example, it can be based on whether User Account Control (UAC) used by MICROSOFT WINDOWS® VISTA Operating System is enabled or disabled, whether current security software updates or patches have been installed or are being installed regularly, whether the client 110 requires regular password changes, and so forth. These security practices for the computer would commonly be managed by an administrator, rather than by the users of the machine. "Trustworthiness" of the user 118 in this context refers to the user's propensity for performing actions or conducting risky behavior likely to lead to the client 110 becoming infected by malware and other computer related threats, where a user 118 that performs actions or conducts risky behavior likely to lead to infection is less trustworthy. For example, it can be based on whether the user 118 attempted to install malware or applications with bad reputations, visited websites with bad reputations, and so forth.

Each client 110 can be assigned a different machine hygiene score based on the trustworthiness or hygiene associated with that particular computer. Where one or more virtual machines (VMs) are running on a client 110, the client 110 can have a machine hygiene score for itself and for any one of or all of the VMs running on the client 110. In addition, each user 118 can be assigned a different user hygiene score based on the trustworthiness or hygiene of that particular user.

By separating the users' scores from the client computers' scores, the security of each computer can be more precisely managed. Since each user has his own score that is based on that particular user's activities and hygiene practices on various client computers used by that user, that user's score does not affect the overall security of a given computer. For example, user A's low score on hygiene will only restrict the activities that user A can perform on workstation 1, and will not restrict the activities that can be performed by good-hygiene practicing user B. Similarly, a poor-hygiene client computer that does not have the latest security patches installed or is otherwise deficient in hygiene will not force a limitation on all clients in a corporate environment. For example, due to workstation 1's low score on hygiene, user A may be limited in the activities that he can perform on that workstation. However, workstation 1's low score will not affect high-scoring workstation 2, on which user A may have more freedom to perform many activities. The hygiene scores for a given user using a given client can be combined to produce an overall combined score for that pair, which will determine what activities that user can perform on that client.

The reputation server 116 can interact with the clients 110 via the network 116 in the management of computer security. In one embodiment, the reputation server 116 can monitor the security practices of the client 110 (or VM's running on the client) and of each user 118 of the client (e.g., by tracking activities performed by the user/client, such as files installed, executed, and downloaded, password practices, malware detections, etc. The server 116 can also calculate the hygiene scores for the client computers 110 and users 118 and combines the scores for a given user/client pair.

In another embodiment, the client computers 110 perform locally one or more of the monitoring, calculating, and combining steps described above. The client 110 executes a security module 120 that monitors the computer security practices of the client 110 (or VMs running on the client) and of each user 118 of the client, and computes machine hygiene scores and user hygiene scores. In some embodiments, the module 120 further combines the scores for a given user/computer pair to determine what activities are permitted on that client by that user. In certain embodiments, all hygiene management steps are performed locally by the security module 120 on the client computers 110.

In some embodiments, hygiene scoring also includes computing reputation scores for files, websites, and other computer-related entities encountered by users/clients. A reputation score is an assessment of the likelihood that an entity is malicious (e.g., is a computer-related threat). For example, if a particular file is predominantly encountered by users 118 with low hygiene scores, there is an elevated risk that the file is malicious because most users that use the file are poor at avoiding computer threats. Therefore, the file is likely to receive a low reputation score. Similarly, a website that is frequently visited by users 118 having high hygiene scores is likely to receive a high reputation score because the website is frequented by users that are good at avoiding computer threats. In some embodiments, the reputation server 116 analyzes the collective states of the clients 110 and/or users 118 to compute these reputation scores. The reputation server 116 or clients 110 can use the scores to calculate overall trustworthiness of the user or client.

The network 112 in FIG. 1, enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
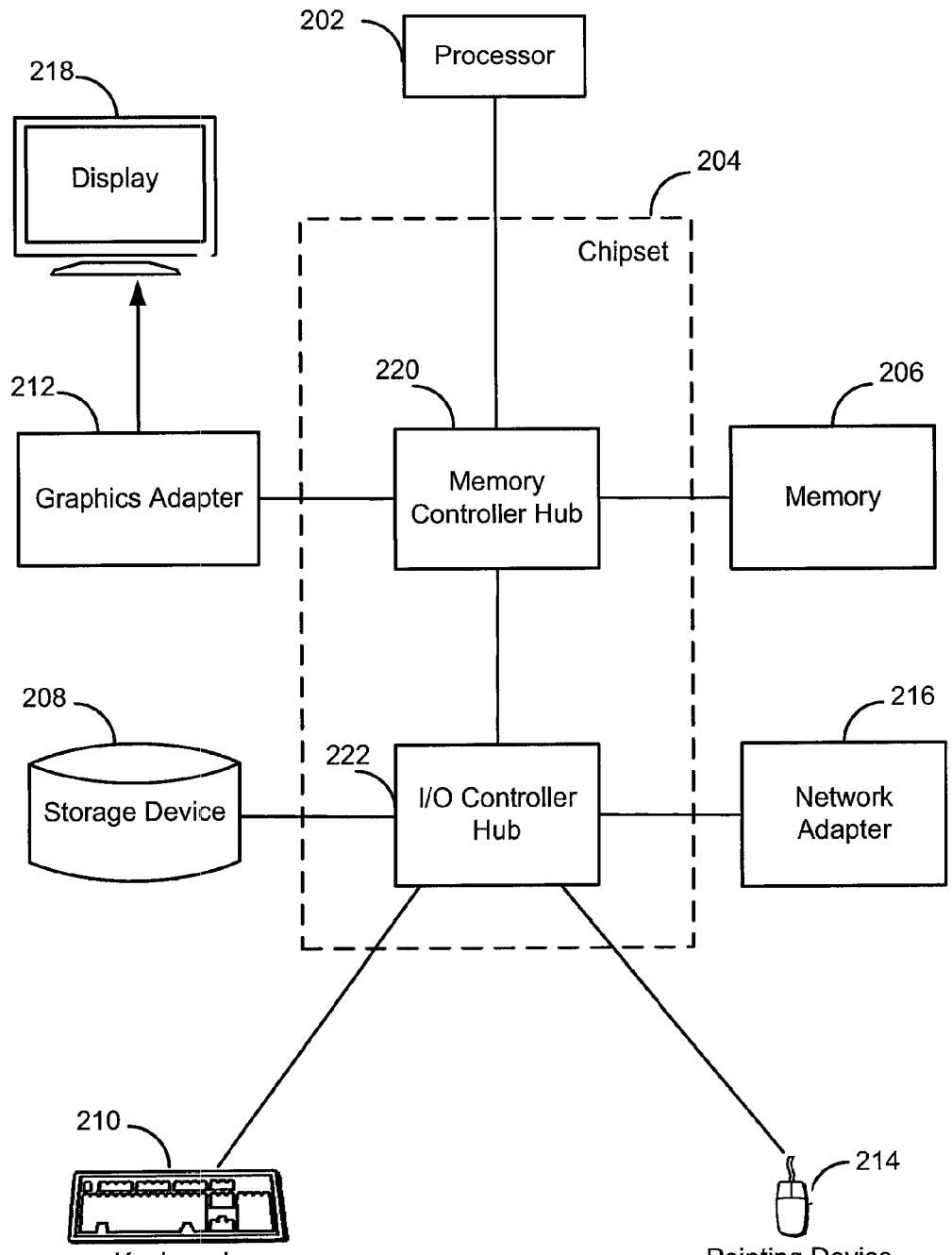
FIG. 2 is a high-level block diagram illustrating a standard computer system 200 for use with the present invention.

FIG. 2 is a high-level block diagram illustrating an example of a computer 200 for use as a server 116 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3:
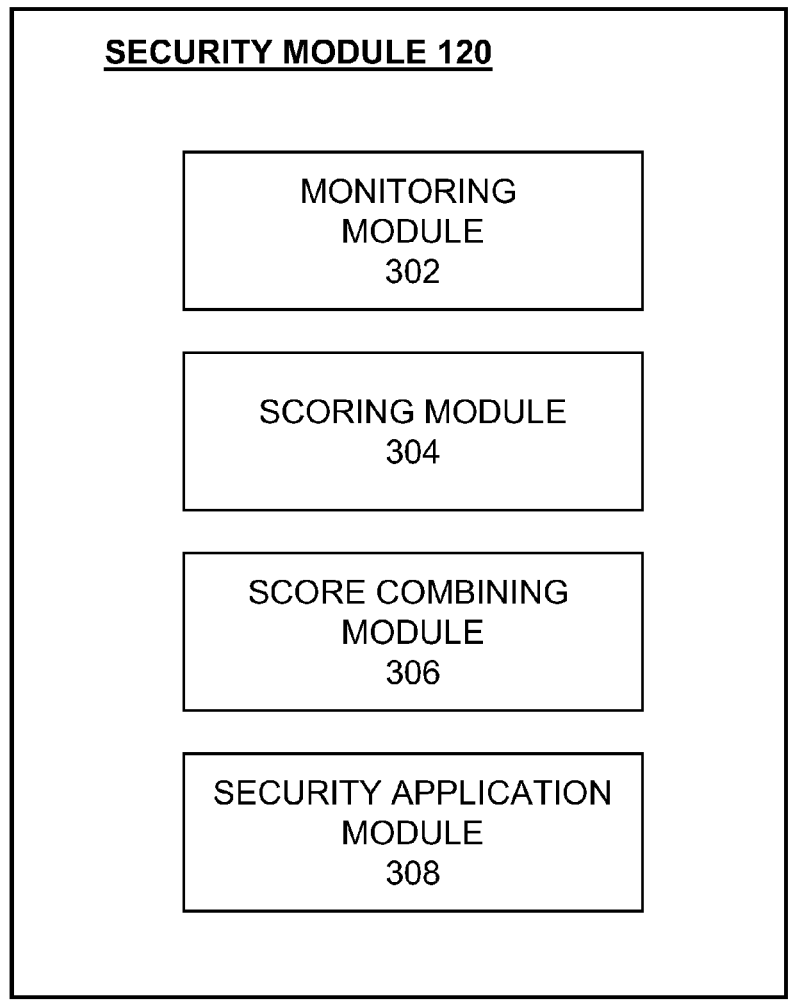
FIG. 3 is a high-level block diagram illustrating the functional modules within the security module 120, according to one embodiment of the present invention.

FIG. 3 is a high-level block diagram illustrating the functional modules within the security module 120, according to one embodiment of the present invention. The security module 120, in the embodiment illustrated in FIG. 3, includes a monitoring module 302, a scoring module 304, a score combining module 306, and a security application module 308. Some embodiments of the security module 120 have different and/or additional modules than those shown in FIG. 3 and the other figures. Likewise, the functionalities can be distributed among the modules in a manner different than described herein. Certain modules and functions can be incorporated into other modules of the security module 120 and/or other entities on the network 112, including server 116.

In one embodiment, the monitoring module 302 monitors computer security practices of the client computer 110. The module 302 tracks activities performed on the client 110 over which the client/administrator has control. The module 302 can track files installed, executed, and downloaded. The module 302 can determine what antivirus or other computer security programs are installed on the client, what firewalls are used, whether regular password changes are required, and what other security practices are employed. The module 302 can monitor whether the client 110 currently has the latest security patches installed, how regularly security patches are installed, what types of security patches are used, and so forth. The module 302 can also track use of UAC or other user account controls by a client 110. Similarly, the module 302 can monitor the type and frequency of malware detections on the client 110. In addition, the module 302 can more generally monitor the state of the configuration of the client, the operating system, the service pack, and so forth.

In one embodiment, the monitoring module 302 further monitors computer security practices of a user of the client. The module 302 tracks activities performed by the user 118 over which the user has control, such as files installed, executed, and downloaded, web sites visited, etc. to determine if the user tends to visit risky websites or download suspicious files that are likely to include malicious code. The module 302 can track a user's password practices, including whether the user tends to pick more secure passwords, regularly change passwords, re-use passwords, etc. In addition, the module 302 can monitor the type and frequency of malware detections occurring on a given client when being used or soon after being used by a given user 118. The module 302 can also monitor a user's email practices, to determine whether the user tends to open suspicious attachments or perform other risky actions.

As explained above, in one embodiment, the reputation server 116 performs the monitoring steps described above. As one example, the server 116 can monitor the computer security practices of the client, and in fact can monitor the practices of multiple clients 110. In addition, the server 116 can monitor security practices of multiple users 118. The server 116 can thus keep track of security-related actions occurring on various clients and the actions performed by users, and can either transmit this information to the client computers 110 or can use this information in computing hygiene scores for the computers (described below).

The scoring module 304 computes a machine hygiene score for the client based on computer security practices of the client, where the machine hygiene score represents an assessment of the trustworthiness of the client. In one embodiment, the module 304 computes the score based on results of the monitoring for that client by module 302 or based on the monitoring results provided by the reputation server 116. In some embodiments, the module 304 retrieves a stored score previously computed for that client, though the module 304 can also compute a score for the client when a user logs onto the client or when the score otherwise is needed.

The score can be calculated in a number of ways. As just one example, a point system could be used in which a client is given a certain number of points for positive security practices, or points are deducted for negative security practices (e.g., points gained for each security patch installed, or points lost for every malware detection). Using a point scale of 1 to 50, for example, a low-scoring client might have only a score of 10 while a high-scoring client might have a score of 45. As another example, a rating system or grading system could be used that grades each client in various categories (e.g., installation of security patches, past malware detections, user account controls, etc.). Other similar point or rating systems could also be applied.

A client's hygiene can vary over time, so machine hygiene scores can also be updated. A poor-hygiene client might have an improvement in security practices. The administrator might install better security software, begin regularly updating security software, and so forth, thus increasing the hygiene of that client. In response, the client's hygiene score can be improved to reflect these better security practices. In some embodiments, the module 304 updates the stored scores for each client regularly based on current monitoring results provided by the monitoring module 302, ensuring that the stored hygiene scores are always current.

The scoring module 304 also computes a user hygiene score for a user of the client based on the computer security practices of the user, where the user hygiene score representing an assessment of the trustworthiness of the user. In one embodiment, the module 304 computes the score based on the results of the monitoring for that user by the module 302 or by the reputation server 116. The score for a user can be tied to a user's account or other identifying information associated with the user. In some embodiments, when a given user logs onto a client, the module 304 retrieves a stored score previously computed for that user based on the user's login account information, user ID, or other identifier. In other embodiments, the module 304 computes a score for the user upon login of the user to his account.

The user's score can be calculated in a number of ways, as described above for the machine hygiene score. Again, the module 304 can use a point system providing or deducting points based on positive or negative security practices of the user (e.g., points lost for each suspicious website visited, or points gained for choosing a secure password), a rating system or grading system, or another similar system.

Like the machine-hygiene scores, the user hygiene scores can also be updated, since a user's hygiene can vary over time. A poor-hygiene user might begin to practice better security by selecting better passwords and updating them regularly, visiting only reliable websites, installing trustworthy programs, etc. In response, the user's hygiene score can be improved to reflect these better security practices. In some embodiments, the module 304 updates the scores stored for each user regularly based on current monitoring results provided by the monitoring module 302.

The scoring module 304 is further configured for calculating reputation scores for files or other entities accessed by the user or the client. For example, a particular program that is suspected to be malicious or is being downloaded from a suspicious source might be given a low reputation score. In calculating the reputation scores for a file, website, etc., the module 304 can also consider practices of the overall user population. A website visited by many good-hygiene users might be given a higher score than one visited by bad-hygiene users. Similarly, a website with no user history might be initially marked as suspicious. The reputation scores can be used in the computing the user hygiene score and the machine hygiene score. For example, in determining the points applied to the user for a user's hygiene score, the module 304 can add up the scores for each website visited by the user, each file downloaded, etc. and include these in the user's overall hygiene score.

The score combining module 306 dynamically combines the user hygiene score computed and the machine hygiene score computed to determine a combined score for an interaction in which the user uses the client. When a given user has logged onto a given client, the module 306 retrieves these scores from the scoring module 304 or from storage, updates the scores if needed, and combines in real time the scores for the user/client pair. If the first user logs off of the client, and a second user then logs onto that same client, the module 306 again combines the scores for the second user/client interaction. Similarly, if the first user logs off that first client and moves on to log onto a second client, the module 306 combines the scores for the first user/second client interaction.

The dynamic combination of scores can be performed in a number of ways. Where a point scoring system is used, the user's score and the client's score can be added together, and may each contribute a certain amount to the overall score. As one example, a scale of 1 to 100 could be used for the combined score, where a user's score contributes to 50% of the overall score and the client's score contributes to the other 50%. A low-scoring user might have a score of 10, while a high-scoring client might have a score of 48. The combined score for this user/client pair might be 58. The user's low score thus lowered the overall score for the interaction. In some embodiments, a user's score or a client's score might contribute different amounts to the combined score. For example, it might be determined that the hygiene of users is more important to determining the overall hygiene of a system. In this case, the user's score can be weighted more heavily than the client's score (e.g., 75% of the combined score).

The security application module 308 applies a level of security policy to the interaction between the user and the client responsive to the combined score. The security policy applied determines what activities the user can perform on the client. Thus, the activities permitted on that client by that user are restricted according to the security policy applied. In comparison to a high-scoring user, a low-scoring user may not be able to visit certain websites or download, access, install certain files, may receive different warnings, or may otherwise be limited on a given client due to the security policy. A high-scoring user on a low-scoring client may also be substantially more restricted in the activities he can perform.

As previously explained, any or all of the steps described above as being performed by locally on the client computers 110 can be performed by the reputation server 116. For example, the server 116 can execute a security module 120, as depicted in FIG. 3. As explained above, the reputation server 116 can perform the monitoring of the client and/or user (or of multiple clients/users) to track their computer security practices, as explained above. The server 116 can transmit this monitoring data to the clients 110, which can then calculate hygiene scores, combine the scores, and apply security policies accordingly. In another embodiment, the reputation server 116 uses the monitoring information gathered by the server 116 or client 110 to calculate hygiene scores for the user and/or client in a fashion similar to scoring module 304, which the server 116 then transmits to the clients 110. In another embodiment, the server 116 uses scores calculated by the server 116 or client 110 and combines the scores similar to score combining module 306. In addition, the server 116 can apply security policies based on the score combination. For example, the module 408 can determine what types of activities should be permitted on a given client by a given user based on the combined score and can transmit this information to the clients 110.

Figure 4:
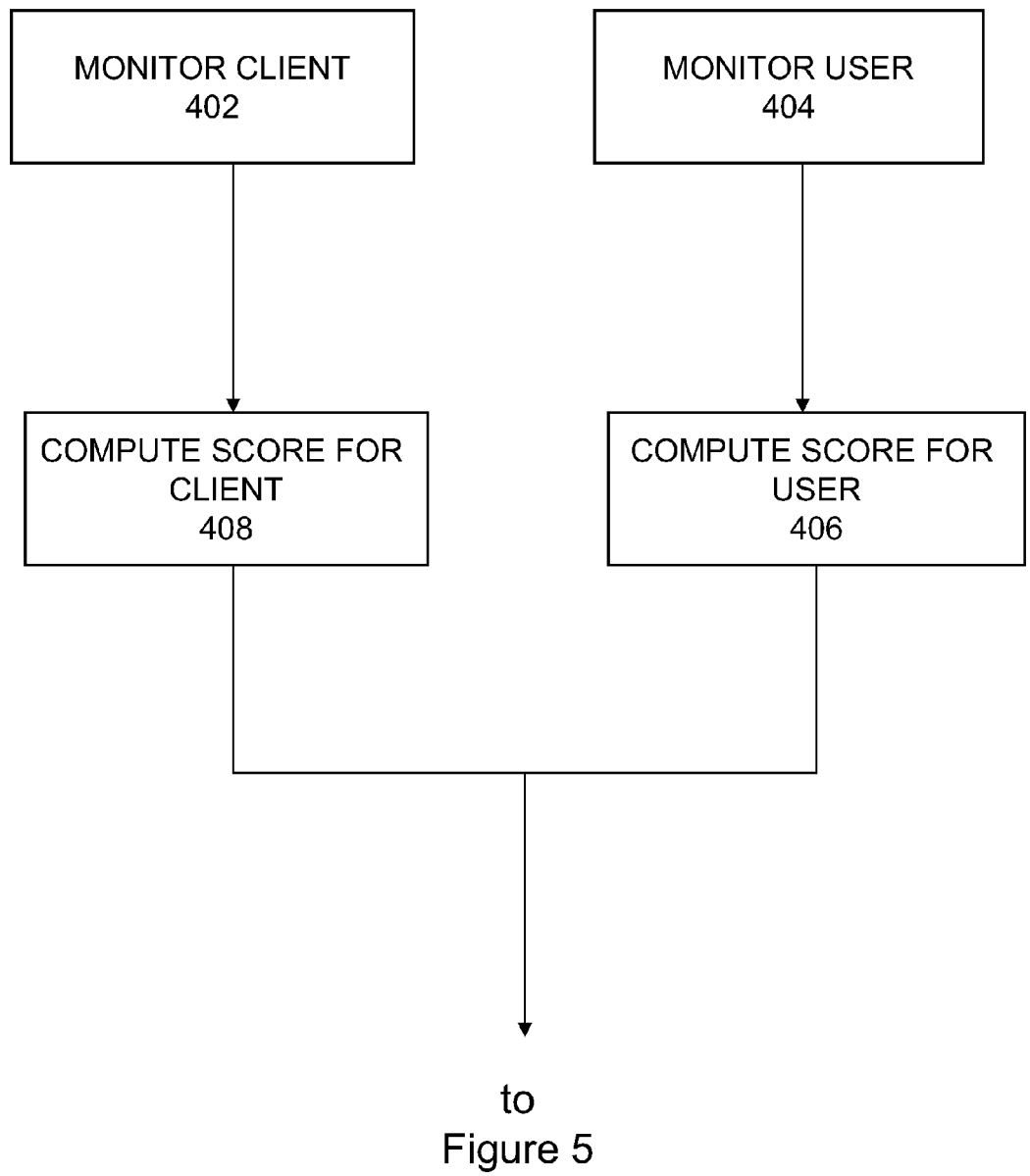
FIG. 4 is a flowchart illustrating steps performed to monitor and compute scores for users/computers, according to one embodiment of the present invention.

Referring now to FIG. 4, there is shown a flowchart illustrating the operation of the security module 120, according to some embodiments of the present invention. Specifically, FIG. 4 illustrates the steps of the security module 120 performed to monitor and compute scores for users/clients. It should be understood that these steps are illustrative only. Different embodiments of the security module 120 may perform the illustrated steps in different orders, omit certain steps, and/or perform additional steps not shown in FIG. 4 (the same is true for FIG. 5). As also explained above, the reputation server 116 can perform any or all of these steps. Thus, the description of the method below in FIGS. 4 and 5 also applies where the reputation server 116, rather than the clients 110, is performing any of the steps.

As shown in FIG. 4, in one embodiment, the security module 120 monitors 402 computer security practices of the client. The module 120 can further monitor 404 computer security practices of the user. As explained above, the module can track various activities relating to computer security that are conducted by the user and by the computer administrator for the client.

The security module 120 computes 406 a machine hygiene score for the client based on computer security practices of the client. The security module 120 further computes 408 a user hygiene score for a user of the client based on the computer security practices of the user. In one embodiment, the scores are computed 406, 408 based on the results of the monitoring 402, 404 described above. As explained above, various methods of computation 406, 408 can be used in calculating the scores for the users/clients. The scores reflect the overall computer security practices of each user and the security practices associated with each client.

Figure 5:
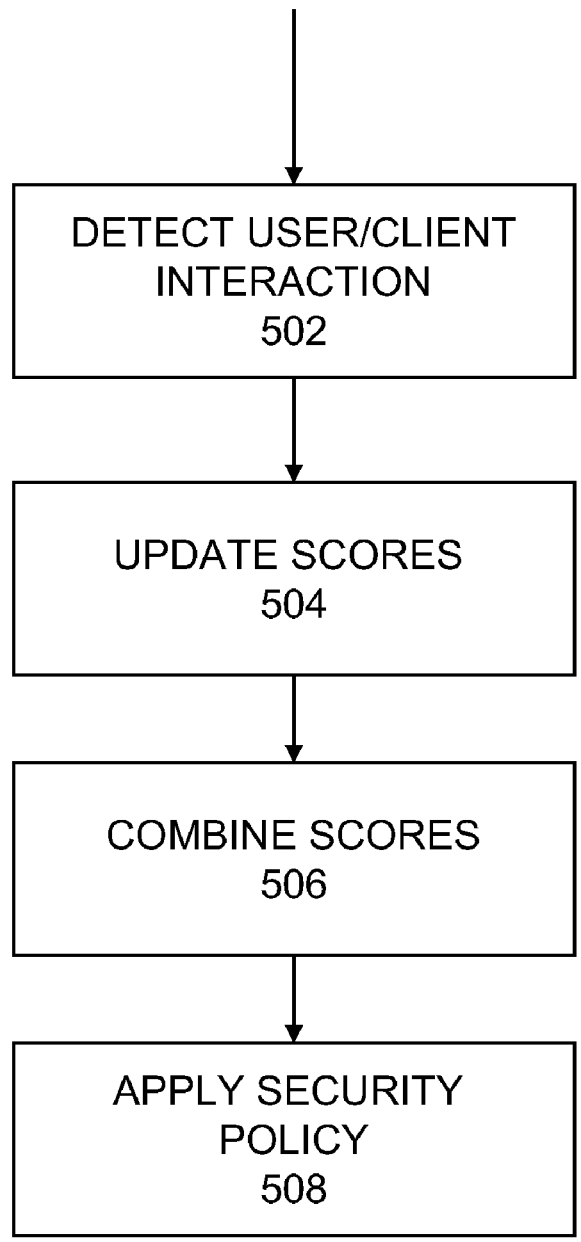
FIG. 5 is a flowchart illustrating steps performed to combine the scores and apply a security policy, according to one embodiment of the present invention.

Referring now to FIG. 5, there is shown a flowchart illustrating the operation of the security module 120, according to some embodiments of the present invention. Specifically, FIG. 5 illustrates the steps of the security module 120 performed to combine the scores and apply a security policy.

In some embodiments, the security module 120 detects 502 an interaction between a user and a client. For example, the module 120 determines that the user is attempting to log onto the client. Once it is determined that a given user is logging onto a given client, the module 120 can retrieve the user hygiene score computed for that user based on login account information for the user. Similarly, the module 120 can retrieve the machine hygiene score computed for that client.

In some embodiments, the module 120 then updates 504 the scores for the user and/or for the client in real time based, for example, on current results of the monitoring 402, 404 of the user and the client. In other embodiments, the scores are updated 504 regularly, so the scores may already reflect the current status of the hygiene for the user/client.

The module 120 dynamically combines 506 the user hygiene score computed and the machine hygiene score computed to determine a combined score for an interaction in which the user uses the client. Similarly, when a second user logs onto the client, or when the first user logs onto a different client, the scores for that user/client pair can be combined 506 to produce a combined score.

The security module 120 applies 508 a level of security policy to the interaction between the user and the client in response to the combined score. The security policy applied determines what activities the user can perform on the client, and the activities permitted on the client by the user can be restricted according to the level of security policy applied. Where a second user logs onto the client, a different level of security policy can be applied in which the second user's activities on the first client are more restricted. Thus, one user's hygiene does not affect another user, and one client's hygiene does not limit another client, but instead the security policies are more precisely applied to each user/client pair.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

We claim:

1. A non-transitory computer-readable storage medium storing executable computer program instructions for applying differing levels of security policy to interactions of users with a client according to hygiene of the users and the client, the computer program instructions comprising instructions for performing steps comprising:

retrieving a machine hygiene score for the client, the machine hygiene score computed based on computer security practices of the client, the machine hygiene score representing an assessment of trustworthiness of the client;

determining that a user is attempting to log onto the client;

retrieving a user hygiene score for the user based on login account information for the user, the user hygiene score computed based on computer security practices of the user, the user hygiene score representing an assessment of trustworthiness of the user;

updating the user hygiene score and the machine hygiene score in real time based on current information determined by monitoring of the computer security practices of the user and the client dynamically combining in real time the user hygiene score and the machine hygiene score to determine a combined score for an interaction in which the user uses the client; and applying a level of security policy to the interaction between the user and the client responsive to the combined score, wherein the security policy applied determines what activities the user can perform on the client.

2. The computer-readable storage medium of claim 1, further comprising instructions for:

computing a user hygiene score for a second user and a third user, the user hygiene score for the second user lower than the user hygiene score for the third user;

dynamically combining the user hygiene score for the second user with the machine hygiene score for the client to determine a combined score for an interaction in which the second user uses the client; and applying a level of security policy to the interaction between the second user and the client, wherein activities permitted for the second user on the client are more restricted than activities permitted for the third user on the client.

3. The computer-readable storage medium of claim 1, further comprising instructions for:

monitoring computer security practices of the client, wherein results of the monitoring are used in computing the machine hygiene score; and monitoring the computer security practices of the user, wherein results of the monitoring are used in computing the user hygiene score.

4. The computer-readable storage medium of claim 3, wherein one or more of the two monitoring, retrieving, and combining steps are performed on a reputation server, the reputation server configured to monitor computer security practices of a plurality of clients and a plurality of users, the monitoring used in computing hygiene scores for the clients and the users.

5. The computer-readable storage medium of claim 1, further comprising instructions for calculating reputation scores for files accessed by the user or the client, a reputation score representing an assessment of whether a file is malicious, wherein the reputation scores are used in computing the user hygiene score.

6. A computer-implemented method of applying differing levels of security policy to interactions of users with clients according to hygiene of the users and the clients, the method comprising:

retrieving a machine hygiene score for the client, the machine hygiene score computed based on computer security practices of the client, the machine hygiene score representing an assessment of trustworthiness of the client;

determining that a user is attempting to log onto the client;

retrieving a user hygiene score for the user based on login account information for the user, the user hygiene score computed based on computer security practices of the user, the user hygiene score representing an assessment of trustworthiness of the user;

updating the user hygiene score and the machine hygiene score in real time based on current information determined by monitoring of the computer security practices of the user and the client;

dynamically combining in real time the user hygiene score and the machine hygiene score to determine a combined score for an interaction in which the user uses the client; and applying a level of security policy to the interaction between the user and the client responsive to the combined score, wherein the security policy applied determines what activities the user can perform on the client.

7. The method of claim 6, further comprising:

computing a user hygiene score for a second user and a third user, the user hygiene score for the second user lower than the user hygiene score for the third user;

dynamically combining the user hygiene score for the second user with the machine hygiene score for the client to determine a combined score for an interaction in which the second user uses the client; and applying a level of security policy to the interaction between the second user and the client, wherein activities permitted for the second user on the client are more restricted than activities permitted for the third user on the client.

8. The method of claim 6, further comprising:

monitoring computer security practices of the client, wherein results of the monitoring are used in computing the machine hygiene score; and monitoring the computer security practices of the user, wherein results of the monitoring are used in computing the user hygiene score.

9. The method of claim 8, wherein one or more of the two monitoring, computing, and combining steps are performed on a reputation server, the reputation server configured to monitor computer security practices of a plurality of clients and a plurality of users, the monitoring used in computing hygiene scores for the clients and the users.

10. The method of claim 6, further comprises calculating reputation scores for files accessed by the user or the client, a reputation score representing an assessment of whether a file is malicious, wherein the reputation scores are used in computing the user hygiene score.

11. A computer system for applying differing levels of security policy to interactions of users with clients according to hygiene of the users and the clients, the system comprising:

a computer-readable storage medium storing executable software modules, comprising:

a scoring module for retrieving a machine hygiene score for the client, the machine hygiene score computed based on computer security practices of the client, the machine hygiene score representing an assessment of trustworthiness of the client;

the scoring module for determining that a user is attempting to log onto the client, and for retrieving a user hygiene score for the user based on login account information for the user, the user hygiene score computed based on computer security practices of the user, the user hygiene score representing an assessment of the trustworthiness of the user;

a score combining module for updating the user hygiene score and the machine hygiene score in real time based on current information determined by monitoring of the computer security practices of the user and the client;

the score combining module further for dynamically combining the user hygiene score and the machine hygiene score to determine a combined score for an interaction in which the user uses the client;

a security application module for applying a level of security policy to the interaction between the user and the client responsive to the combined score, wherein the security policy applied determines what activities the user can perform on the client; and a processor configured to execute the software modules stored by the computer readable storage medium.

12. The system of claim 11, wherein:

the scoring module is further configured for computing a user hygiene score for a second user and a third user, the user hygiene score for the second user lower than the user hygiene score for the third user;

the score combining module is further configured for dynamically combining the user hygiene score for the second user with the machine hygiene score for the client to determine a combined score for the interaction in which the second user uses the client; and the security application module is further configured for applying a level of security policy to the interaction between the second user and the client, wherein activities permitted for the second user on the client are more restricted than activities permitted for the third user on the client.

13. The system of claim 11, further comprising:

a monitoring module for monitoring computer security practices of the client, wherein results of the monitoring are used in computing the machine hygiene score; and the monitoring module for monitoring the computer security practices of the user, wherein results of the monitoring are used in computing the user hygiene score.

14. The system of claim 11, wherein the scoring module is further configured for calculating reputation scores for files accessed by the user or the client, a reputation score representing an assessment of whether a file is malicious, the reputation scores used in the computing of the user hygiene score and the machine hygiene score.

* * * * *